United States Patent [19]

Hirst

[11] Patent Number: 5,108,187
[45] Date of Patent: Apr. 28, 1992

[54] SECTION GRATING GENERATOR

[75] Inventor: George E. Hirst, Irvine, Calif.

[73] Assignee: The Perkin Elmer Corporation, Norwalk, Conn.

[21] Appl. No.: 722,393

[22] Filed: Jun. 19, 1991

Related U.S. Application Data

[63] Continuation of Ser. No. 501,569, Mar. 30, 1990, abandoned.

[51] Int. Cl.[5] .......................... G02B 5/18; B43L 13/24
[52] U.S. Cl. .................................... 359/566; 33/19.3; 359/574
[58] Field of Search ............. 350/3.64, 162.11, 162.16, 350/162.17, 162.2, 162.23; 33/19.1, 19.2, 19.3

[56] References Cited

U.S. PATENT DOCUMENTS

| | | | |
|---|---|---|---|
| 1,744,642 | 1/1930 | Kondo | 350/162.23 |
| 2,463,280 | 3/1949 | Kaehni et al. | 350/162.16 |
| 3,108,379 | 10/1963 | Aaron | 33/19.1 |
| 3,130,098 | 4/1964 | Levengood | 350/162.23 |
| 3,344,526 | 10/1967 | Horsfield | 33/19.1 |
| 3,578,845 | 5/1971 | Brooks et al. | 350/162.2 |
| 3,639,991 | 2/1972 | Douglas | 33/19.2 |
| 4,012,843 | 3/1977 | Harada et al. | 33/19.2 |
| 4,219,933 | 9/1980 | Kita et al. | 33/19.2 |
| 4,426,131 | 1/1984 | Gowan | 350/162.2 |
| 4,673,241 | 6/1987 | Nishiwaki et al. | 350/3.64 |
| 4,690,506 | 9/1987 | Kita et al. | 33/19.2 |

Primary Examiner—Bruce Y. Arnold
Assistant Examiner—Martin Lerner
Attorney, Agent, or Firm—Edwin T. Grimes; Joseph R. Dwyer

[57] ABSTRACT

An apparatus comprising a circular ruling engine having a supporting means oscillatable in a controlled manner with a substrate section on said supporting means and means for lifting and lowering a ruling means to rule said substrate section to generate a grating pattern from a number of grating patterns to produce an off-axis grating section. Also disclosed is a method for forming off-axis grating sections.

8 Claims, 1 Drawing Sheet

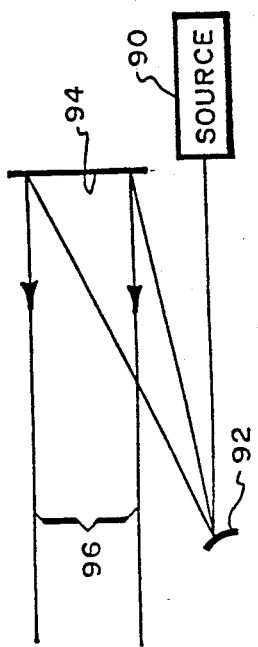
Fig. 4.
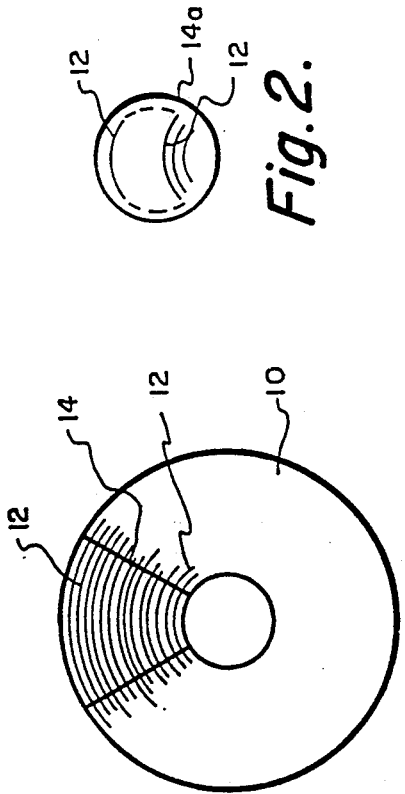
Fig. 2.
Fig. 1. (PRIOR ART)
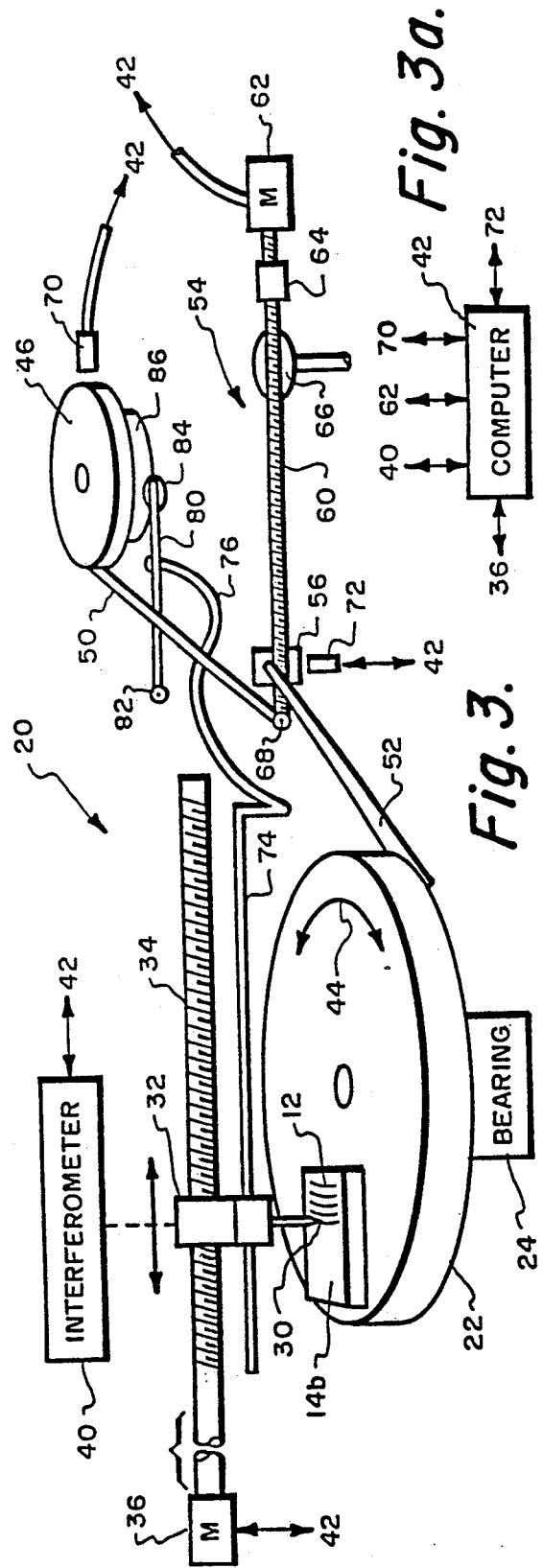
Fig. 3a.
Fig. 3.

SECTION GRATING GENERATOR

This is a continuation of application Ser. No. 07/501,569, filed Mar. 30, 1990 now abandoned.

BACKGROUND OF THE INVENTION

This invention relates generally to diffraction gratings and is specifically directed to a method and apparatus for generating diffraction grating sections without first having to generate full size diffraction gratings on large circular blank substrates.

One method of generating circular variably-spaced (reflective) diffraction gratings is by ruling techniques using a diamond or other ruling means in a computer and interferometer controlled circular ruling engine. This method is used to generate on-axis "diffractive optics" for optical null testing and other applications. In this ruling engine, the blank grating substrate is continuously rotated on an air bearing table and the ruling means is moved radially, either continuously to produce a spiral groove, or in steps to produce circular grooves.

However, in many applications, the only part of the grating that is required is an off-axis section which means that a full grating must first be generated on a large blank which is excessively large and expensive. when only a part is needed and where the required section is then extracted afterwards by cutting or replication. These methods are wasteful and time consuming. FIG. 1 illustrates such a circular finished master grating on a full size circular substrate 10 with rulings 12 (only partly shown) and an off-axis section 14 that is cut from the finished product.

SUMMARY OF THE INVENTION

It is an object of this invention to provide a method and apparatus for generating off-axis circular grating sections on substrates which are only marginally larger than the ruled areas.

The invention which fulfills the foregoing object comprises oscillating a ruling engine table in a controlled manner which has a substrate section of a selected shape thereon, lifting and lowering the ruling means to rule the substrate to generate an off-axis grating section with a pattern selected from a number of various grating patterns.

BRIEF DESCRIPTION OF THE DRAWINGS

FIG. 1 illustrates a circular master grating substrate of the prior art with a section delineated, FIG. 2 illustrates a reduced circular off-axis master grating section produced by this invention, FIGS. 3 and 3a illustrate one embodiment of the apparatus of this invention in which the method of this invention may be performed to produce an off-axis master grating section, FIG. 3a is a block diagram of a computer connected to the apparatus of FIG. 3, and FIG. 4 illustrates one example of the use of a circular grating section in a collimator.

DETAILED DESCRIPTION

As mentioned above, FIG. 1 illustrates a circular master grating substrate 10 with a ruled grating pattern 12, which may be variably spaced, with a section 14 delineated as an example of the prior art method of providing off-axis circular grating sections which were expensive and wasteful to produce; all of which limited the use of such circular grating sections because of their cost.

FIG. 2 illustrates a circularly ruled off-axis master grating section 14a and in FIG. 3 there is a rectangular off-axis master grating section 14b in the process of being ruled.

FIGS. 3 and 3a illustrate a circular ruling engine 20 with a substrate support, such as a table 22, disposed on an air bearing 24 on which the rectangular grating substrate 14b is positioned for ruling. In the prior art, a full circular substrate blank, such as 14, would be positioned on the table 22 and a ruling means (diamond) 30 is moved radially, either continuously to produce a spiral groove, or in steps to produce circular grooves on the full circular substrate blank by movement of carriage 32 and the diamond 30. A screw drive 34 driven by motor 36 as the substrate rotates provides the radial movement of the carriage 32 and diamond 30, all under the control of an interferometer 40 and computer 42.

To rule the reduced grating substrate blank 14b in the practice of this invention, the table 22 is oscillated, rather than rotated, as represented by arrows 44 and the travel of the table 22 during oscillation is varied as the diamond 30 moves radially on the table so that the stroke of the diamond is kept within the edges of the substrate 14b.

To do this, the circular ruling engine 20 is modified by providing a rotatable crank drive 46, a pair of crank arms 50 and 52 and a variable stroke adjustment means identified in its entirety as 54. The variable stroke adjustment means 54 comprises a follower 56 mounted on a screw drive 60 rotated by motor 62 through coupling 64. Pivotal movement of the follower and screw drive is accomodated by pivot 66. The crank arm 50 is pivotally connected at one end to the crank drive 46 and its other end is pivotally connected at 68 to one end of the screw drive 60. One end of crank 52 is pivotally connected to the follower 56 and its other end is pivotally connected to the table 22. Thus, the amount of oscillation of the table 22 may be reduced or increased depending upon the direction of radial travel of the diamond 30 by movement of the follower 56 thus avoiding the limitation of being only able to rule within the shape of a sector, such as 14 in FIG. 1.

As stated before, a grating approximating a square or a rectangle, as illustrated in FIG. 3, or one of circular shape, as illustrated in FIG. 2, can be produced by continuously varying the amount of oscillation by program control from the computer 42. The position of the carriage 32 (diamond 30) is sensed by the interferometer 40 and its position is controlled by the computer 42 acting on motor 36. The position of the crank drive 46 is sensed by an optical sensor 70 and monitored by the computer 42. Similarly, the initial position of the follower 56 is sensed by an optical initialization sensor 72 and is thereafter controlled by the computer 42 acting on motor 62.

To appropriately rule the blank 14b in one direction only, means are provided to lift the diamond 30 off the substrate 14b in one direction of oscillation of table 22, i.e., the return stroke, and to lower the diamond 30 onto the substrate 14b during the other direction of oscillation, i.e., the forward stroke, of the table 22. One means to perform this lifting function comprises an arrangement wherein the carriage 32 is connected to a lift arm 74 which, in turn, is connected through a suitable linkage means 76 to a lifting cam means which comprises a arm 80, pivoted at 82, with a cam follower 84 which engages a camming surface 86 formed as part of the crank drive 46. By this arrangement, the diamond 30 is lifted off the substrate 14b on the return stroke as the carriage is moved radially by the lead screw 34.

From the foregoing, it can be seen that after positioning a master substrate blank, such as 14b, on the table 22, the initial position of the follower 56 is determined when the ruling of the blank is to begin (whether near the radially inner area of the blank or near the radially outer area of the blank, with respect to the center of the table) and then, during ruling, rotation of the crank drive 46 is sensed by the sensor 70 so that the motor 36 will incrimentally rotate the screw drive 34 to move the carriage 32 and diamond 30 radially while at the same time the motor 62 will control the position of the follower to vary the oscillation travel of the table 22.

It should be apparent that the stroke of the oscillating table 22 is controlled to confine the grating pattern within the periphery of the blank section 14b and may be controlled to rule blank sections of types other than sectors. A variety of off-axis circular grating sections, such as diffractive paraboloids or ellipsoids, can be generated with high precision and with the economy of size and replication methods may be used to produce many low cost replicas from these master gratings.

As also will be apparent to those skilled in the art, such inexpensive gratings will become valuable components in laser beam expanders, collimators, interferometers and monochromators for limited wavelength range. FIG. 4 shows one example of the use of such off-axis gratings where monochromatic light from light source 90 is directed to a curved mirror 92, or a spatial filter (not shown), and onto grating 94 which directs a collimated light beam 96 therefrom.

I claim:

1. In a circular ruling engine having a supporting means,
    a planar diffraction grating blank section placed on said supporting means,
    a ruling means capable of ruling a fully circular planar diffraction grating for circularly ruling said blank section to form a circularly ruled planar diffraction grating section, and
    means for oscillating said supporting means so that said blank section is ruled within the outer periphery of said blank section.

2. The ruling engine as claimed in claim 1 further including means for controlling the stroke of said oscillations so that grating sections of different shapes and sizes may be ruled within the edges of said blank.

3. The ruling engine as claimed in claim 2 further including means for controlling said ruling means so that said blank is ruled in one direction during oscillation of the supporting means.

4. The ruling engine as claimed in claim 3 wherein said means for oscillating said supporting means comprises rotatable crank means and crank arms with pivotal connection means between said crank arms all of which are connected to said supporting means and means for changing the position of said pivotal connection means.

5. A method of ruling a diffraction grating blank section to form a circularly ruled planar diffraction grating section comprising the steps of:
    placing a blank section of a selected size on a supporting means in a circular ruling engine,
    oscillating said supporting means within defined limits of said blank section, and
    lifting and lowering a ruling means to rule said blank section to form a circularly ruled planar diffraction grating section as said ruling means moves radially of the direction of oscillation of said supporting means.

6. An improvement in a planar circular ruling engine for normally ruling circular diffraction gratings which are fully circular and including a ruling means to form such a fully circularly ruled planar diffraction grating,
    a rotatable supporting means in said ruling engine on which a grating blank section is placed,
    said grating blank section being less in area than a fully circular grating blank,
    oscillator means connected to said supporting means to oscillate said supporting means within predetermined limits so that said grating blank section is ruled within its outer periphery thereby forming a diffraction grating section without using a fully circular grating blank.

7. The circular ruling engine as claimed in claim 6 wherein said means to oscillate said supporting means includes means to vary the predetermined limits of oscillation to form ruled grating sections of different sizes and shapes.

8. In a circular ruling engine having suitable supporting means including movable ruling means for ruling a planar grating blank to form a circularly ruled planar diffraction grating, the method of forming a diffraction grating section without the use of a fully circular grating blank, comprising the steps of:
    placing a grating blank section on said supporting means,
    oscillating said supporting means an amount less than the width of said grating blank section,
    moving said ruling means in a direction normal to the travel path of said oscillating supporting means to form arcuate rulings on said grating blank section.

* * * * *